US008509965B2

(12) United States Patent
Lin

(10) Patent No.: US 8,509,965 B2
(45) Date of Patent: *Aug. 13, 2013

(54) INTEGRATED COLLISION AVOIDANCE SYSTEM FOR AIR VEHICLE

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 1002 days.

This patent is subject to a terminal disclaimer.

(21) Appl. No.: 11/999,310

(22) Filed: Dec. 4, 2007

(65) Prior Publication Data

US 2008/0243383 A1    Oct. 2, 2008

Related U.S. Application Data

(60) Provisional application No. 60/874,708, filed on Dec. 12, 2006.

(51) Int. Cl.
*G01C 23/00* (2006.01)
*G05D 1/00* (2006.01)
*G08G 5/04* (2006.01)

(52) U.S. Cl.
USPC ..................... 701/3; 701/9; 340/961

(58) Field of Classification Search
USPC ........... 701/200–215, 2, 3, 23, 535; 340/945, 340/961
See application file for complete search history.

(56) References Cited

U.S. PATENT DOCUMENTS

| 5,325,445 | A | * | 6/1994 | Herbert | 382/225 |
|---|---|---|---|---|---|
| 6,021,374 | A | * | 2/2000 | Wood | 701/301 |
| 6,480,789 | B2 | * | 11/2002 | Lin | 701/301 |
| 6,512,976 | B1 | * | 1/2003 | Sabatino et al. | 701/207 |
| 6,650,779 | B2 | * | 11/2003 | Dorrity et al. | 382/228 |
| 7,039,239 | B2 | * | 5/2006 | Loui et al. | 382/225 |
| 7,236,104 | B2 | * | 6/2007 | Tran | 340/961 |
| 7,260,248 | B2 | * | 8/2007 | Kaufman et al. | 382/128 |
| 7,551,990 | B2 | * | 6/2009 | Khatwa | 701/9 |
| 2006/0091654 | A1 | * | 5/2006 | De Mersseman et al. | 280/735 |
| 2007/0093945 | A1 | * | 4/2007 | Grzywna et al. | 701/23 |

\* cited by examiner

*Primary Examiner* — Thomas Tarcza
*Assistant Examiner* — Adam Tissot
(74) *Attorney, Agent, or Firm* — Raymond Y. Chan; David and Raymond Patent Firm

(57) ABSTRACT

Collision with ground/water/terrain and midair obstacles is one of the common causes of severe aircraft accidents. The various data from the coremicro AHRS/INS/GPS Integration Unit, terrain data base, and object detection sensors are processed to produce collision warning audio/visual messages and collision detection and avoidance of terrain and obstacles through generation of guidance commands in a closed-loop system. The vision sensors provide more information for the Integrated System, such as, terrain recognition and ranging of terrain and obstacles, which plays an important role to the improvement of the Integrated Collision Avoidance System.

8 Claims, 9 Drawing Sheets

INTEGRATED COLLISION AVOIDANCE SYSTEM FOR AIR VEHICLE

CROSS REFERENCE OF RELATED APPLICATION

This is a regular application of a provisional application having an application No. 60/874,708 and filing date of Dec. 12, 2006.

GOVERNMENT INTERESTS

This invention was made with Government support under contract NNL05AA96P awarded by NASA. The Government has certain rights in the invention.

BACKGROUND OF THE PRESENT INVENTION

1. Field of Invention

The present invention relates to an integrated positioning/ground proximity warning method and system, and more particularly to a low cost, lightweight and vision based miniaturized Integrated Collision Avoidance Enhanced GNC Micro-System for Smart Air Vehicles and to convert the invention successes into a commercial line of a "low-cost, small, lightweight GNC Micro-System for Aircraft Collision Avoidance.

2. Description of Related Arts

Current properly instrumented aircraft, operating individually or in teams with manned vehicles and unmanned vehicles, in the same airspace for a specific mission, are required to perform many missions. Safety of the aircraft is of paramount importance in all airspace environments. Avoiding collisions between aircraft and obstacles is a basic necessity for various operations. A real-time collision avoidance subsystem detects obstacles and provides warning messages to the pilot or controls the aircraft so that collisions with obstacles are avoided.

Adverse flight conditions make the autonomous avoidance of collisions a formidable problem for aircraft. First, collision avoidance for aircraft is associated with their sensors environment for detection of objects and for prediction of potential collision within their flight paths. Second, the collision avoidance should provide the aircraft with the capability of escaping from possible collisions. This means that an optimal escape trajectory is required for operational safety of the aircraft.

NASA is seeking advanced technologies to achieve smart, adaptive aerospace vehicles with intelligence. The innovative Integrated System is related to NASA's interests because based on vision it can become aware of potential collisions with terrain and obstacles and react rapidly to provide guidance for avoiding those disasters while maintaining the flight mission.

SUMMARY OF THE PRESENT INVENTION

The objective of this invention is to demonstrate a low cost, lightweight and vision based miniaturized Integrated Collision Avoidance Enhanced GNC Micro-System for Smart Air Vehicles and to convert the invention successes into a commercial line of a "low-cost, small, lightweight GNC Micro-System for Aircraft Collision Avoidance: Vision Based Miniaturized Aircraft Integrated Collision Avoidance System" product. This product is referred as "The Integrated System" in this invention. The Integrated System takes advantage of the American GNC Corporation (AGNC), our company, coremicro AHRS/INS/GPS Integration Unit and is based on AGNC patents to achieve a vision based integrated, guidance, navigation, and control (GNC) micro-system for aircraft and UAVs, which is capable of assisting aircraft pilots to avoid approach and collision with ground/water and other near objects in flight, thus, improving safety, reliability and cost effectiveness. The various data from the coremicro AHRS/INS/GPS Integration Unit, terrain data base, and object detection sensors are processed to produce collision warning audio/visual messages and collision detection and avoidance of terrain and obstacles through generation of guidance commands in a closed-loop system.

This invention investigated the vision based object detection and tracking system. A statistical model based object recognition algorithm was designed which successfully classified different terrain, such as, mountains, trees, etc. A ranging method with stereo cameras was demonstrated. An integrated navigation/object detection and tracking system based on the AGNC coremicro AHRS/INS/GPS Integration Unit 1010 and cameras is demonstrated by the robot platforms. This robot demo system provides navigation and collision avoidance simultaneously.

AGNC low cost, light weight, vision based miniaturized, Integrated Collision Avoidance Enhanced GNC System is utilized for smart air vehicles, based on coremicro AHRS/INS/GPS Integration Unit and patents. The Integrated System extends AGNC's existing product line and utilizes its patented technologies to direct aircraft in and out of austere airfields and landing pads located in remote deserts, mountains, and forested areas and to lead pilots around obstacles to avoid the terrain, water, and other near obstacles, such as towers, power lines, structures, and trees, and to minimize the annual loss of valuable aircraft and lives.

Integration of the AGNC products is directed at a unique solution for vision based collision avoidance for general aviation aircraft and unmanned air vehicles, such as, (1) Statistical model based algorithm is designed for terrain and obstacle recognition, and the recognition results are used to aid the decision of the Ground Proximity Warning System (GPWS); (2) Stereo cameras are used to provide range and 3D measurements of a target, which are used for positioning; (3) As a necessary step toward instrumenting the small, lightweight, Vision Based GNC Micro-System into a particular Aircraft Integrated Collision Avoidance System for flight demonstrations and tests, a flexible infrastructure utilizing the AGNC GPS/IMU REALTIME SIMULATOR for closed-loop testing and evaluation of many components of the GNC system has been designed for the Aircraft Integrated Collision Avoidance System; (4) Different modes are designed to fuse the information of the imaging sensors with that of other sensors for adaptive maneuvering target tracking and guidance, such as, sensor level fusion, track level fusion, and partially processed data fusion.

1.1 Identification of the Aircraft Collision Avoidance Problems

Collision is one of the common causes of severe aircraft accidents. An aircraft may collide with the terrain, another aircraft, towers, powerlines, etc. Although a standalone operated positioning systems, such as, existing civil GPWS and Enhanced Ground Proximity Warning System (EGPWS) have been designed to prevent crashes, they do not provide adequate warning messages of obstacles nor guidance around the obstacles, and are generally installed in a large aircraft. It is urgent to enhance the aviation safety with low-cost, small-sized GNC systems.

An independent Ground Proximity Warning System became mandatory by the FAA in 1974 for commercial turbojet/turboprop aircraft with more than 10 passenger seats which fly in U.S. airspace, traditional ground proximity warning systems have dramatically reduced the number of Controlled Flight Into Terrain accidents among airlines, by monitoring the aircraft's height above ground as determined by a radio altimeter. Although traditional ground proximity warning systems have saved thousands of lives, they still fail to prevent all Controlled Flight Into Terrain accidents. A traditional GPWS can not really tell what is ahead of the airplane. It can only look down, as the radio altimeter measures the distance from the airplane to the ground. The GPWS is used to predict if a potential terrain problem lies ahead by tracking information from the recent past and projecting any trend into the future. This can warn a pilot, driver or operator when the airplane is flying towards terrain that has a rising slope, but it can not warn in time to avoid, for example, a sheer cliff or extremely steep slope.

A positioning system is used to provide position, velocity, altitude, altitude rate information, and etc., for an aircraft flight control and management system. Traditional positioning equipment in a civil aircraft includes global positioning system (GPS), inertial navigation system (INS), radio navigation system, and integrated positioning system. Although the INS used in the traditional positioning systems can provide very high accuracy, its cost is huge and its size is large. The availability of low cost inertial sensors, such as, the AGNC (MEMS) coremicro IMU inertial sensors, provide an obvious choice for implementing low cost, highly accurate, continuous positioning of a vehicle by employing a low cost strapdown inertial system with the compensation of an external sensor. The global positioning system receiver is an ideal external sensor for an inertial navigation system.

To enhance the performance of the GPWS and EGPWS based on standalone GPS/INS positioning systems, it is necessary to incorporate with the Vision Based Miniaturized Aircraft integrated Collision Avoidance System to detect the objects nearby, and avoid collision with these objects by some algorithms. Some sensors, such as, video camera, infrared camera, radar, ladar, are fused to detect nearby objects.

1.2 Functions of the Vision Based Miniaturized Aircraft Integrated Collision Avoidance System The function of the vision based aircraft integrated positioning/collision avoidance system is to avoid collision with terrain and obstacles. The vehicle position/velocity/altitude information is provided by the positioning sensors, such as, GPS, INS, baro altimeter, radio altimeter, etc. The potential collision with terrain is predicted by using the vehicle state information and surrounding terrain height from the onboard terrain database.

Another method for terrain collision avoidance is to detect the terrain, such as, mountains and trees, by using the vision sensors. A statistical model based object recognition algorithm was designed which successfully classified different terrain, such as, mountains, trees, etc. A ranging method with stereo cameras was demonstrated. The vision sensor provides more information for the ground proximity warning system.

To avoid collision with obstacles, the Integrated System dynamically assesses its own time varying temporal spaces about itself using measurements obtained from the object detection system. Two space areas about the aircraft are defined to trigger Collision Avoidance Action, A: Safe space. The aircraft may continue its mission.

B: Unsafe space. The unsafe space represents the area, which if violated by the obstacle, requires the aircraft to perform an evasive maneuver thus, mitigating a potential collision.

Radar and vision sensors are used to detect and track the obstacles nearby. The collision detection processing module continues to track the aircraft and predict the projected trajectory of the obstacle. Based on the predicted trajectory and maneuver capability of the aircraft, the collision avoidance guidance modules decide to perform the maneuver type and generate the escape trajectory.

Many different types of evasive maneuvers are investigated and evaluated for safety and integrity, such as horizontal maneuvers, vertical maneuvers, "inward", "outward", pull-up, dive, and inverted pull down.

1.3 Significant Improvement of the Vision Based Miniaturized Aircraft Integrated Collision Avoidance System Compared with the conventional positioning and ground proximity warning systems, the enhanced vision based integrated collision avoidance system has a lot of advantages, such as, enhanced ground proximity warning ability by using a worldwide digital terrain database and the vision based terrain recognition system, higher positioning accuracy, higher obstacle avoidance ability by using fusion of different object detection sensors, such as, camera, radar, etc. The vision sensors used in the invention provide more information for the Integrated System, such as, terrain recognition, and ranging of terrain and obstacles, which play an important role in the improvement of the integrated collision avoidance system.

1.3.1 Performance Improvement of EGPWS by the Integrated System

Terrain airplane accidents have been a worldwide problem. The available improved ground proximity warning system, which is called the Enhanced Ground Proximity Warning System, is the result of an effort to further reduce the controlled flight into terrain risk.

Our first method of improving the EGPWS is to use a worldwide digital terrain database. Also, the enhanced ground proximity warning system adds two other enhancements to the traditional ground proximity warning system:

1. It can provide the flight crew a map-like display of nearby terrain.

2. It sounds an audible alert approximately one minute's flight time or more away from terrain. Traditional ground proximity warning systems typically sound a warning from a few seconds to about 30 seconds from terrain, but average 10 to 15 seconds.

The enhanced ground proximity warning system computer uses information provided by the onboard navigation system and terrain database. The enhanced ground proximity warning system computer uses aircraft position, performance, and configuration data to calculate an envelope along the projected flight path of the aircraft and compares that to the terrain database. Since the enhanced ground proximity warning system display can show nearby terrain, pilots are much less likely to continue flying toward that terrain.

Our second method of improving the EGPWS is to use a vision based terrain recognition and ranging algorithm. A statistical model based terrain recognition algorithm is designed. This algorithm successfully recognizes different terrain, such as, mountains, trees, etc. Furthermore, a stereo camera is used to detect the range between the aircraft and the terrain. Based on the aircraft states (position/velocity/altitude), and the terrain (mountains/trees) pixel coordinates in the aerial images and the range between the aircraft and the terrain, the EGPWS detects the potential collision with the terrain.

1.3.2 Performance Improvement of Aircraft Positioning by the Integrated System

Conventional integrated global positioning/inertial navigation systems integrate the information from an inertial measurement unit and a global positioning system receiver to obtain improved navigation solution. Conventional GPWS uses the position information provided by the conventional integrated global positioning/inertial navigation systems or stand-alone global positioning systems and the information from a radio altimeter and a baro altimeter and a terrain database to solve the ground proximity warning problem. The process for both conventional integrated global positioning/inertial navigation systems and conventional ground proximity warning systems is implemented in software in microprocessors.

As advances in speed and memory of microprocessors occur, it is possible to implement an integrated positioning and ground proximity warning system. Furthermore, an integrated process for position solution and ground proximity warning solution can provide better performance than an independent positioning system and an independent ground proximity warning system, because the information from the vision sensors, radio altimeter, the baro altimeter, and the terrain database which are employed by conventional GPWS has potential capability for improving the accuracy and reliability of conventional positioning systems, and improved position information in turn improve the performance of conventional ground proximity warning systems.

1.3.3 Performance Improvement of Midair Collision Avoidance by the Integrated System As many of the aircraft operating in the same airspace fly in close formation and execute highly dynamic maneuvers, pilots have routinely identified a midair collision between aircraft as a most likely mishap. In addition, it is possible to obtain an optimal collision avoidance solution with a near object by further incorporating an object detection system with the results of the integration of the ground proximity warning system and multiple navigation sensors.

The performance improvement of midair collision avoidance is realized by the following methods: (1) higher positioning accuracy by the Integrated System; (2) detection and tracking by fusion of a stereo camera and other object detection sensors; (3) data link between aircraft.

1.3.4 Other Advantages of the Integrated System Over Traditional Independent Systems In order to maximize safety of the vehicle operation for future commercial application, it is highly desirable for an Integrated System capable of providing optimal navigation solution and optimal ground/water/object collision avoidance capabilities.

Accordingly, compared to existing separate processes and systems for positioning and ground proximity warning systems, it is the objective of the Integrated System to provide an integrated method and system for positioning and preventing Controlled Flight Into Terrain flight accidents for aircraft to obtain improved performance, such as navigation accuracy, high degree of tolerance to loss of a global positioning system signal, global positioning system integrity monitoring, precise and reliable ground proximity warning information, and to make air travel safer in increasingly busy skies, as follows:

1. The performance of an integrated positioning system and the ground proximity warning system is unattainable in the two systems alone.

2. The positioning accuracy of the Integrated System is higher than the conventional integrated global positioning system/inertial navigation system alone.

3. The Integrated System has the ability to detect the malfunction of the global positioning system satellite.

4. Prompt and accurate ground proximity warning message is available, due to more accurate positioning solution provided by the Integrated System.

5. The Integrated System reduces false ground proximity warning probability, due to a more accurate positioning solution provided by the Integrated System.

6. Compared with the conventional enhanced ground proximity warning systems, in the Integrated System, an external navigation system is not required to support the ground proximity warning solution. This is especially affordable for small commercial aircraft vehicles.

The Integrated System provides a positioning and proximity warning method and system thereof, which are an integrated method and system for positioning and proximity warning for a vehicle in air, land, and water, which uses information from a global positioning system, an inertial navigation system, a baro altimeter, a radio altimeter, a terrain database, a vehicle control and management system, and an object detection system.

As compared with existing EGPWS, the innovative Integrated System affordably provides integral combination of not only EGPWS function, but also:

Autonomous integrated navigation solution, not dependent on GPS signals being available.

Midair object detection and collision avoidance guidance.

Autonomous Integrated Navigation of the Integrated System

The highly accurate and reliable autonomous integrated navigation solution is the result of innovative multi-mode integration filtering approach using the coremicro AHRS/INS/GPS Integration Unit:

(1) GPS/INS mode with optional DGPS (differential GPS) correction capabilities from a ground reference GPS receiver via a telecommunication subsystem.

(2) Aided INS mode with onboard aiding navigation sensor data. The onboard aiding navigation sensor measurements that can provide potential aiding of INS include: baro altitude measurements from a baro altimeter or air data computer; radar altitude measurements from a radar altimeter; air speed measurements from the air data computer, terrain data from onboard terrain database (processed together with altitude measurements from a radar altimeter and baro altimeter to provide accurate update of INS), speed measurement from the Doppler radar, and magnetic heading from the magnetometer.

(3) AHRS (Altitude and Heading Reference System) mode.

Multiple Object Detection Sensors

The candidate sensors for the object detection system are optimized (possibly combined) from radar, LADAR, millimeter wave (MMW), infrared and video, passive and/or active imagers. Multiple level data fusion methods are used to fuse these sensors for terrain and obstacle recognition and tracking.

1.4 Innovative Accomplishments

The significant accomplishments are outlined as follows:

A system architecture is designed which integrates ground proximity warning, midair obstacle collision avoidance, and navigation/positioning by fusion of information from positioning sensors (GPS, MEMS coremicro IMU, vision, altimeter, terrain database), obstacle detection sensors (vision, radar), and data communication.

A real-time color tracking robot demo system is designed. Feature based vision tracking is to be emphasized and is integrated with the color tracking method.

Statistical model based algorithm is designed for terrain and obstacle recognition, and the recognition results are used to aid the decision of the collision avoidance.

Stereo cameras are used to provide range and 3D measurements of a target, which are used for positioning. Stereo camera is fused with other sensors, such as, radar, to provide a more accurate target tracking.

The cost-effective Interacting Multiple Model (IMM) estimator is implemented to improve the estimation accuracy of target tracking based on radar measurements.

Information fusion structure is designed for collision avoidance of aircraft with terrain and midair obstacles. The Integrated System is implemented by fusion of positioning information, terrain database, terrain recognition and stereo camera based terrain ranging. The midair collision avoidance is implemented by fusion of both obstacle tracking and recognition.

As a necessary step toward instrumenting the small, low cost, lightweight, Vision Based GNC Micro-System into a particular Aircraft Integrated Collision Avoidance System for flight demonstrations and tests, a flexible infrastructure utilizing the AGNC GPS/IMU REALTIME SIMULATOR for closed-loop hardware-in-the-loop testing and evaluation of many components of the GNC system has been designed.

Different modes are designed to fuse the information of the imaging sensors with that of other sensors for adaptive maneuvering target tracking and guidance, such as, sensor level fusion, track level fusion, and partially processed data fusion.

These and other objectives, features, and advantages of the present invention will become apparent from the following detailed description, the accompanying drawings, and the appended claims.

DETAILED DESCRIPTION OF THE PREFERRED EMBODIMENT

1 Statistical Model Based Terrain and Obstacle Recognition

The imaging sensor 100 can provide measurements of the target range, position, and altitude, which are fused with other object detection sensors, such as, radar, for obstacle tracking. Besides the vision based obstacle tracking, the imaging sensors can provide more information which is very useful for the ground proximity warning and obstacle collision avoidance decision. For example, different terrain, such as, mountains and trees, are recognized by our statistical model based image recognition methods. Even if the navigation based ground proximity warning system cannot work, the imaging sensor provides another method for terrain collision avoidance. Recognition of different aircraft nearby is helpful in choosing the best midair collision avoidance strategies.

Statistical model based image object recognition, identifying specific patterns and structures, is widely used in many engineering and scientific fields, such as, in applications for defense, machine vision and medical imaging. These techniques classify objects through a feature vector in a high-dimensional feature space.

There are two different classification methods for object recognition based on statistical modeling: supervised classification and unsupervised classification. In supervised classification, a set of features of known classification is provided as a training set which is then used to establish the classification method's parametric criteria that allow the various object classes of interest to be separated in feature space. Unsupervised classification uses clustering algorithms to affect an automated class delineation process in feature space.

Figure 1:
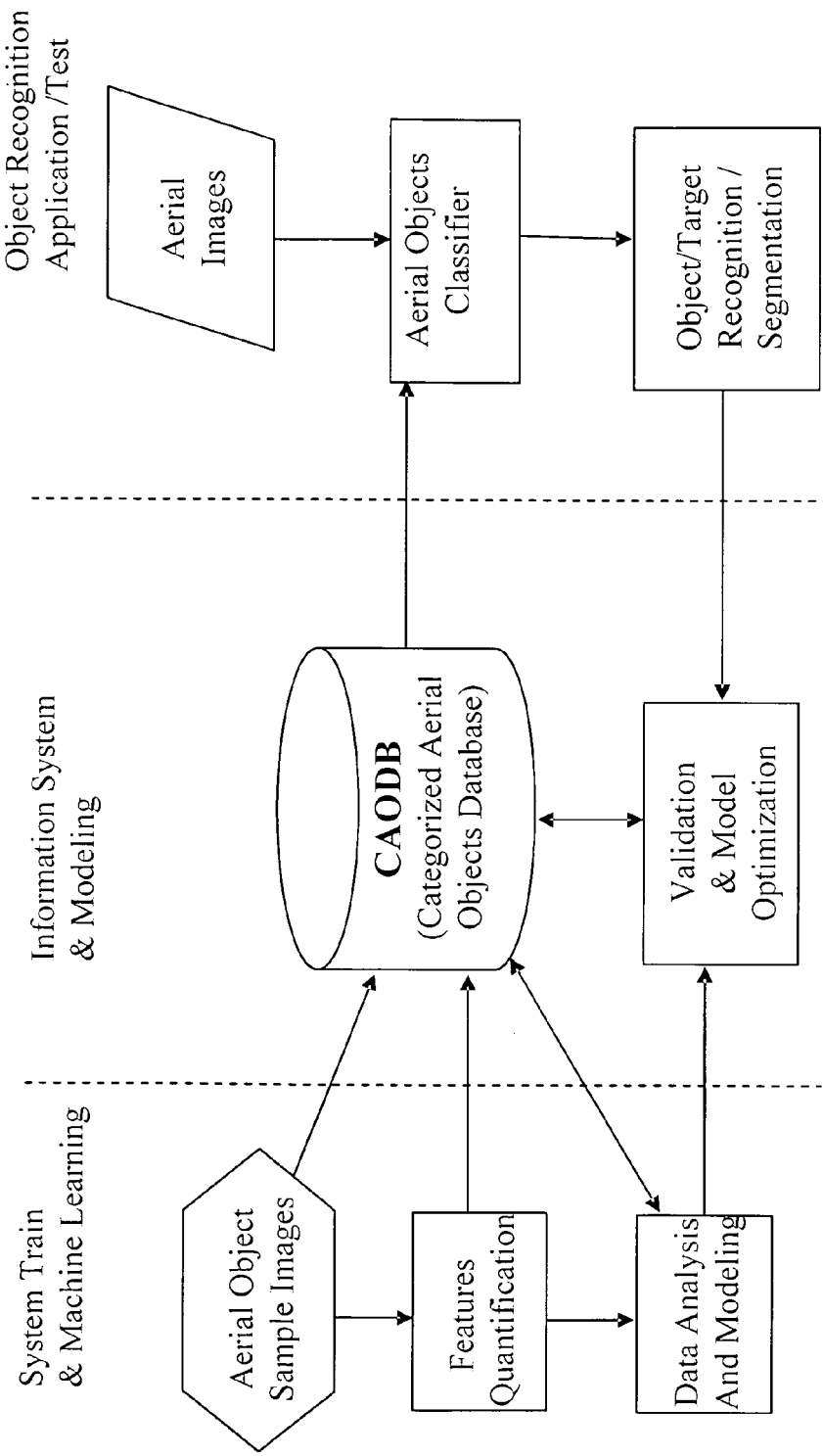
FIG. 1 is a block diagram of a system architecture of supervised object recognition.

The system architecture of supervised object recognition is shown in FIG. 1. The task of the object recognition system involves the identification of natural objects, such as, mountains, trees and grass, and cultural objects, such as, highways, roads and buildings. From the features of training images, the designed system sets up a knowledge bank of image features to represent the expert knowledge, as utilized by humans for object recognition, by specifying "rules" for image interpretation.

The supervised system consists of three modules: system training and machine learning, information system and modeling, and cultural objects extraction. The system training and machine learning module is trained for recognition and segmentation of natural objects and cultural objects through feature extraction, feature data analysis and statistical modeling. Information system and modeling consists of data storage (CAIDB: Categorized Aerial Images Database) of sampled object images and their features, and model optimization tools for feature selection to structure an image classifier. After modeling the knowledge-based object recognition system, the application and test module is implemented to extract natural and man-made objects from aerial images. The application module includes an aerial-image objects classifier, natural objects and cultural objects recognition and labeling. In order to improve the system performance, validation and verification of test or actual aerial images is executed.

Figure 2:
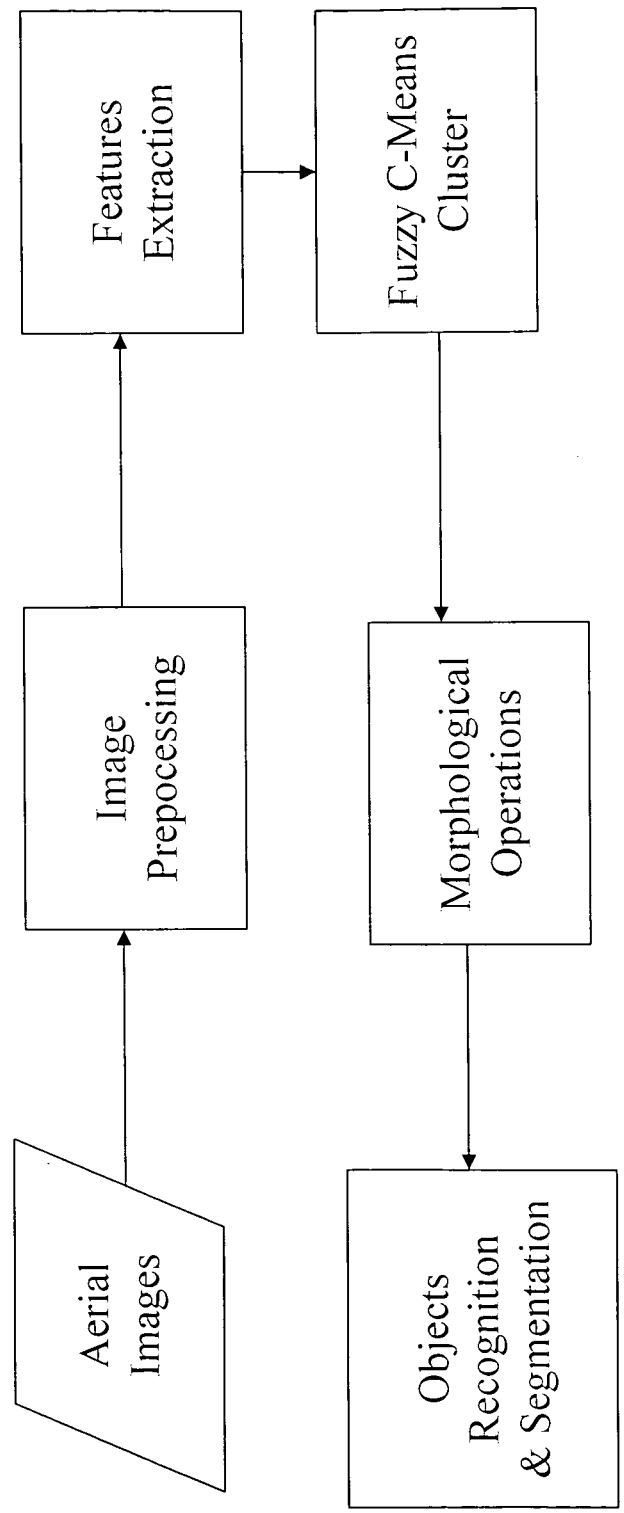
FIG. 2 is a block diagram of a pipeline of unsupervised fuzzy image recognition.

We designed a Fuzzy C-Means (FCM) based method to extract cultural and natural objects (mountains, grass, trees and man-made objects, such as, buildings and roads) from an aerial image. FIG. 2 is the image processing pipeline. In the FCM-based classification, we use the Fuzzy-C-Means clustering algorithms to implement an automated class delineation process in feature space. As described above, FCM is an unsupervised classifier based on clustering unlabeled data (pixels in the 2D aerial image) into different groups (yielding, labeled pixels) on the basis of minimizing a distance measure in feature space. The FCM-based unsupervised classifier accomplishes the desired separation of the cultural objects and natural objects. It is different from the supervised classification case, where the data are pre-labeled as to their class membership and the classification process amounts to the establishment of thresholds or parameters that result from the established, by training, class clusters in feature space.

In FIG. 2 an aerial image is first preprocessed for generalization and contrast adjustment. In feature quantification, several features are extracted to form a high-dimension feature space. The data set of each pixel in feature space then are input into an FCM classifier to be labeled as mountain, tree, grass, building or road. After every pixel is labeled, a series of binary image morphological operations is used to remove small islands or holes on the segmentation masks generated by the FCM classifier. These operations act as a further outlier discriminator to improve the quality of the object segmentation and extraction.

2 Information Fusion Based Avoidance of Collision with Terrain and Midair Obstacles

2.1 Information Fusion Based Terrain Collision Avoidance

Figure 3:
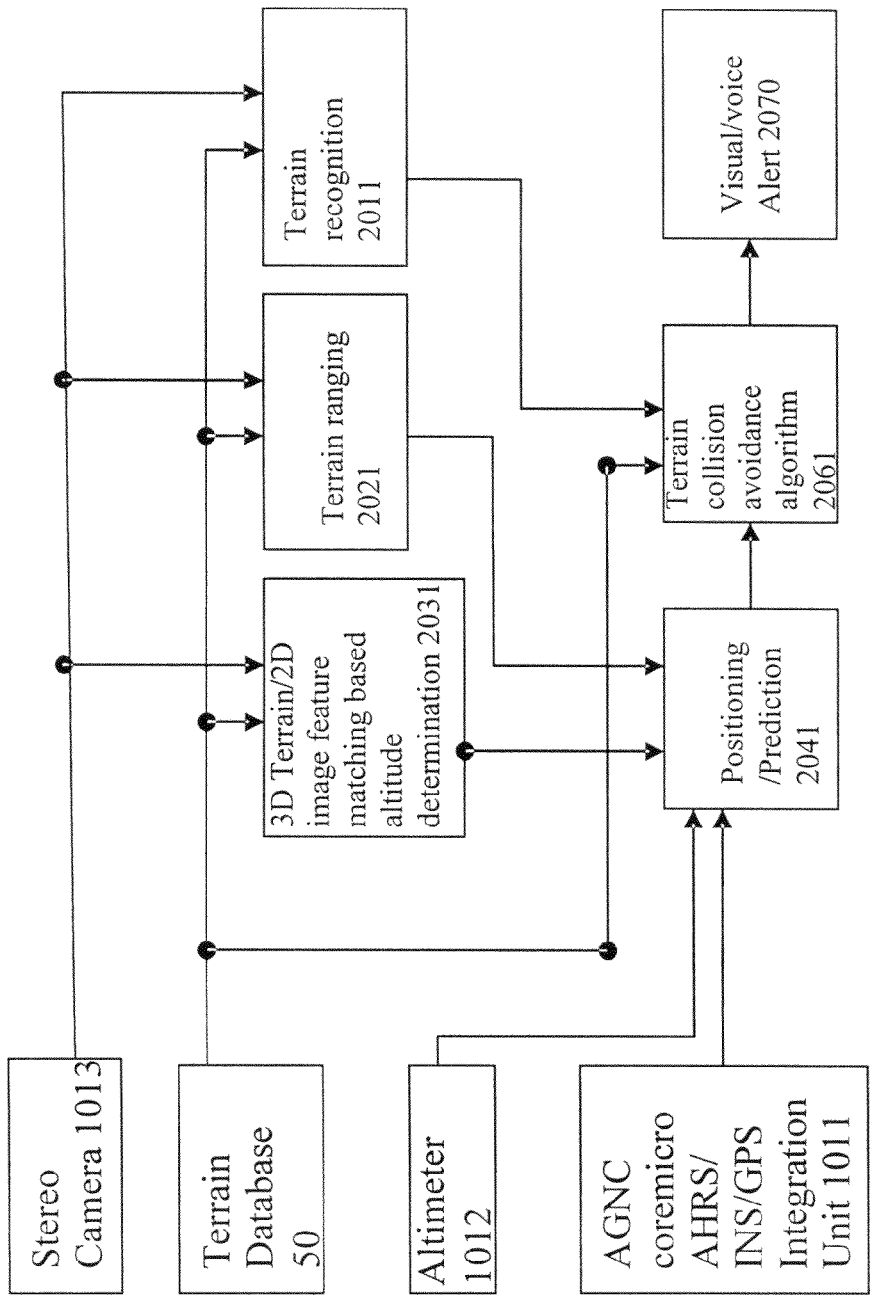
FIG. 3 is a block diagram of a terrain collision warning based on information fusion.

A terrain collision avoidance method is designed based on information fusion of camera, GPS, INS, and terrain database. As shown in FIG. 3, stereo camera 1013 provides terrain ranging information. Different terrain, such as, mountains, and trees, is recognized by the image recognition algorithms discussed above. Based on 3D terrain and 2D image feature matching 2030, the platform altitude is determined. The final estimation of the platform altitude, position, velocity, etc, is obtained by fusion of feature matching based altitude measurements, stereo camera based terrain ranging 2021, and the measurements from the AGNC AHRS/INS/GPS Integration Unit 1011, and other aiding sensors, such as altimeter 1012 and odometer. The terrain collision avoidance algorithm 2061 is based on the platform positioning, flight path prediction 632, terrain recognition 2011, and terrain database. First, the terrain environment is determined by these information sources. Secondly, the flight path is predicted by the platform altitude, position, and velocity. Thirdly, the terrain collision is predicted based on the flight path prediction 632 and terrain environment. Finally, if there is a possibility of terrain collision, visual and voice alert 2070 are provided to the pilot, and the optimal escaping method is designed to avoid collision with terrain nearby.

2.2 Information Fusion Based Midair Collision Avoidance

Figure 4:
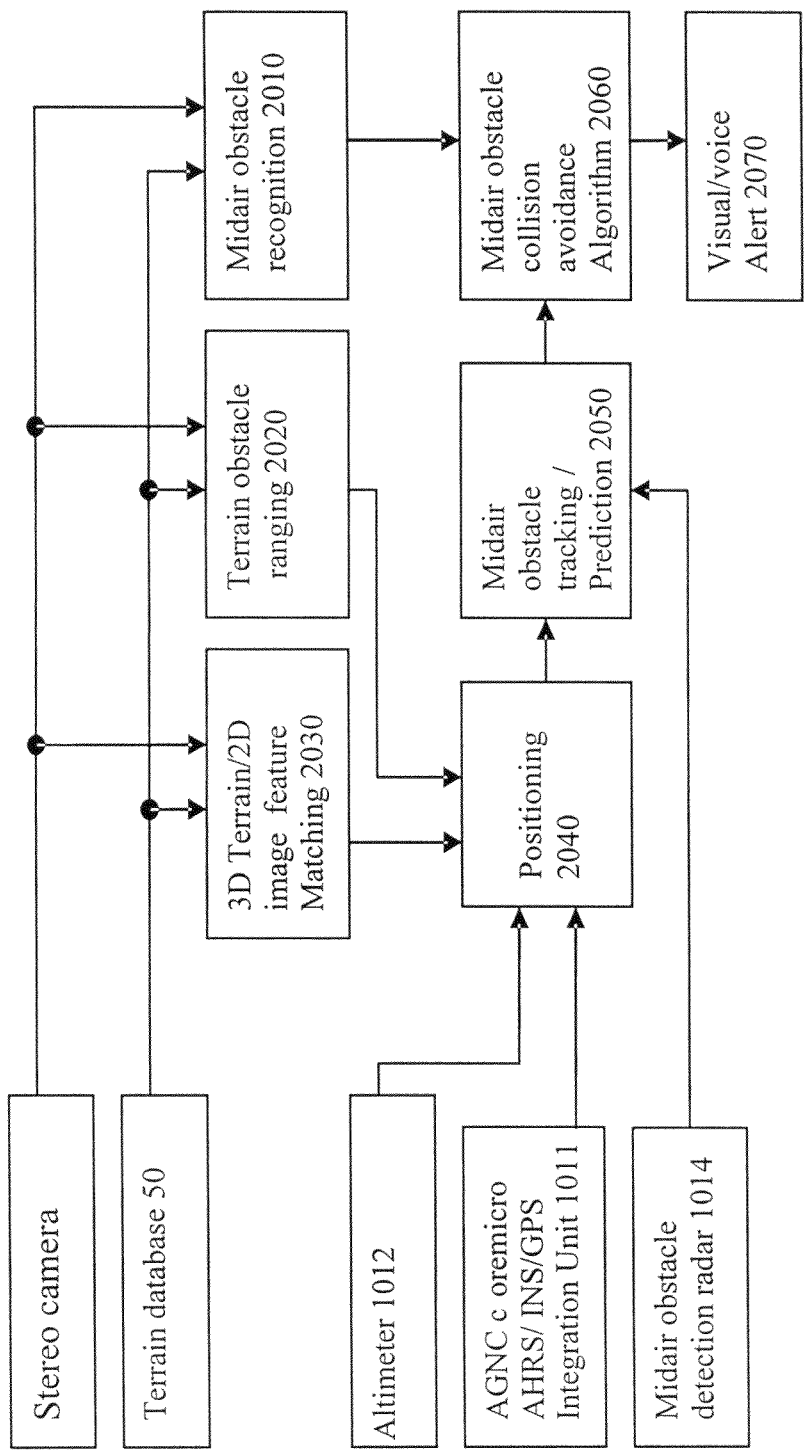
FIG. 4 is a block diagram of a midair collision warning based on information fusion.

With the increase in high air traffic volume, midair collisions become a growing concern throughout the world. A midair collision avoidance method is designed based on information fusion of camera, GPS, INS, terrain database, and midair obstacle detection radar, altimeter, etc. As shown in FIG. 4, the platform altitude, position, and velocity are estimated by fusion of the AGNC coremicro AHRS/INS/GPS Integration Unit 1010, stereo camera 1013, terrain database 50, etc. Midair obstacles are detected and tracked by the obstacle detection sensors. The midair collision avoidance algorithm 2060 is based on the positioning and flight path prediction 632 of the vehicle and the obstacles. If there is a possibility of midair collision, visual and voice alert 2070 is provided to the pilot, and the optimal escaping method is designed.

Two kinds of obstacle detection sensors are used here for midair collision avoidance: imaging sensor 100 (such as, stereo camera) and radar (such as, Moving Target Indicator (MTI) radar). The stereo camera 1013 can provide ranging information from the obstacle to the vehicle and obstacle recognition information. The vision based obstacle recognition is discussed in the former sections.

Radar based obstacle detection and tracking is an important component of the midair collision avoidance subsystem. The first step is to detect the targets in clutter. A lot of algorithms have been proposed in the literature for target detection in clutter, such as, Constant False Alarm Rate (CFAR), time-frequency analysis, wavelet based, neural network based, and fractal based methods. CFAR based method is widely used for real-time automatic radar target detection. The detection threshold is adaptively determined online. With this adaptive threshold, the influence of the environment is minimized.

Once midair obstacles are detected by the MTI radar, they are continuously tracked for possible maneuvers. Maneuver target tracking is an important problem complicated by the fact that target maneuvers are generally unknown and are not available directly through radar measurements in practice. The decision-based techniques are widely used for maneuver detection, where the state estimation is based on a hard decision on the target motion model which is made by the maneuver detector. Different techniques are implemented and evaluated, including the chi-square test such as measurement residual based and input estimate based detectors, and the likelihood ratio test such as the generalized likelihood ratio (GLR) based, the Cumulative Sum (CUSUM) based, and marginalized likelihood ratio based (MLR) detectors. Sequential detection of target maneuvers is also investigated. The update of state estimation is triggered by the detection of target maneuvers through model switching, either to a model with higher process noise, a maneuver model or state augmentation.

3 Implementation of the Integrated System: Integrated Positioning/Ground Proximity Warning System Processor A vision based Integrated Positioning/GPWS method is designed. Besides the positioning and terrain database, the vision based terrain recognition and stereo terrain ranging are also used for ground proximity warning decision. Different terrain, such as, mountains and trees are recognized by the image recognition methods discussed above. The ranging information and 3D depth map are built up by the stereo cameras. Based on the information from the imaging sensors, the ground proximity warning can be implemented even if the GPS/INS positioning system does not work under certain environments.

3.1 Structure of the Integrated Positioning/Proximity Warning System

Figure 5:
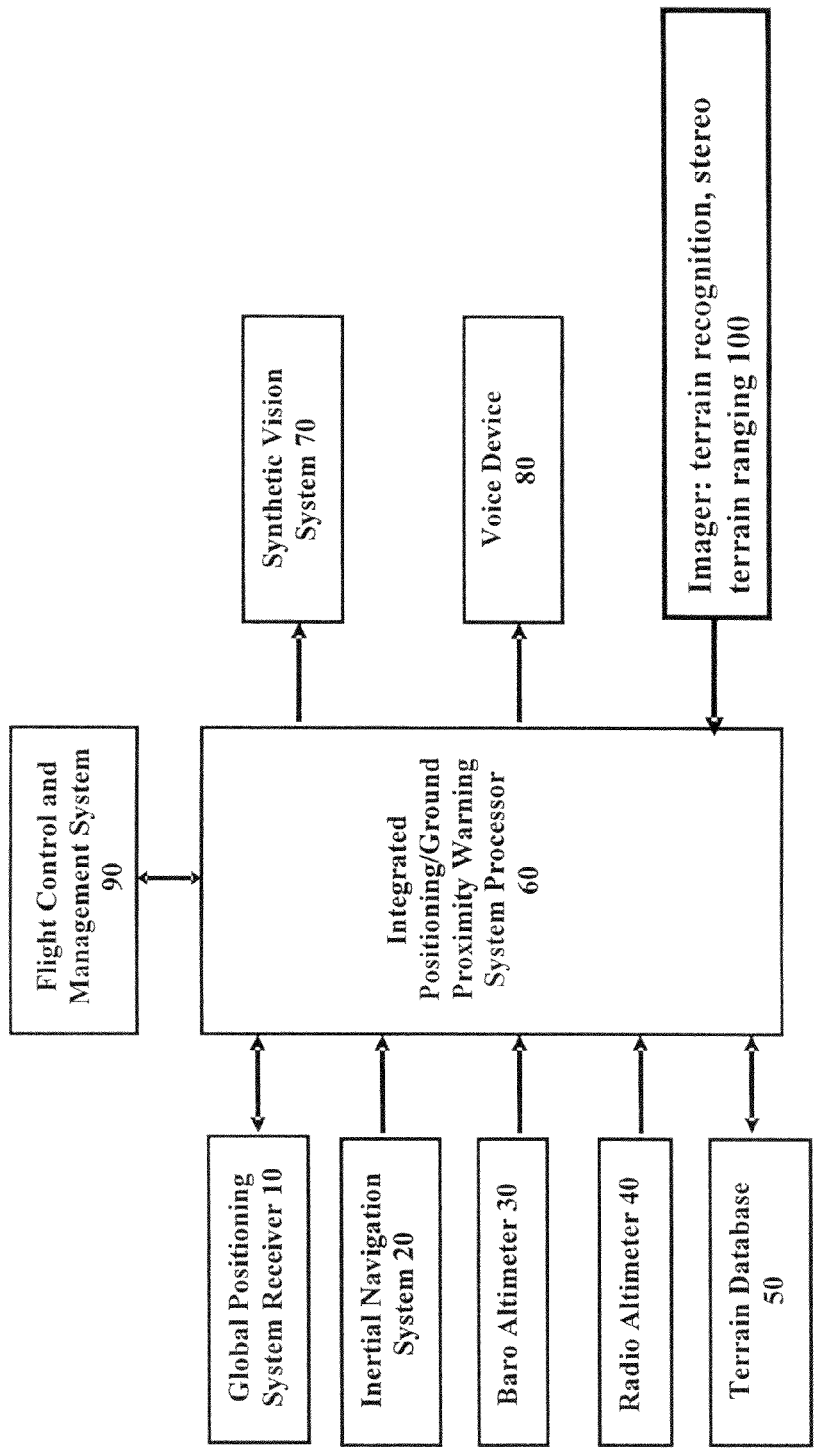
FIG. 5 is a block diagram of an integrated positioning and ground proximity warning method and system.

Referring to FIG. 5, the integrated positioning and ground proximity warning system comprises an imaging sensor 100 (for terrain recognition, ranging, 3D depth map), a global positioning system receiver 10, an inertial navigation system 20, a baro altimeter 30, a radio altimeter 40, a terrain database 50, and a positioning/ground proximity warning system processor 60.

3.2 Integrated Positioning/Ground Proximity Warning System Processor

The integrated positioning/ground proximity warning system processor 60 provides not only precision position and dynamic data of the host vehicle, but also ground warning message to the object tracking and collision avoidance processor. The position and dynamic data of the host vehicle and the absolute position or relative position of near objects obtained from the object detection system are used to detect potential collisions between the host vehicle and near objects. The ground proximity warning message is incorporated in the collision avoidance processing. For example, when a ground proximity warning is detected and the host vehicle can not avoid a collision with the other vehicle by performing a dive because it is too close to the ground.

3.3 Positioning Sensors

The positioning sensors connected with the Integrated Positioning/Ground Proximity Warning Processor include: imaging sensor 100, GPS, INS, baro altimeter 30, radio altimeter 40, terrain database 50, vision, etc.

The imaging sensor 100 may be a monocular camera, stereo camera, infrared imager, etc. The imaging sensor 100 measures the target position and altitude, for target tracking. It is also used to recognize different terrain, such as, mountains and trees, which provides useful information for ground proximity warning decision 633.

The global positioning system receiver 10 receives global positioning system signals and deriving position, velocity and time information or pseudorange and delta range measurements of the global positioning system. The global position system receiver may be selected as a differential global position system receiver or as a multi-antenna global position system receiver or as a global position system receiver with wide area augmentation.

The inertial navigation system 20 solves navigation equations with angular rate and specific force information from an inertial measurement unit and obtaining an inertial navigation solution. The inertial navigation system 20, which is connected with the integrated positioning/ground proximity warning system processor 60, and receives optimal estimates of the inertial navigation solution errors and inertial sensor errors from the integrated positioning/ground proximity warning system processor 60, and outputs the inertial navigation solution, such as position, velocity and altitude to the integrated positioning/ground proximity warning system processor 60.

The baro altimeter 30 provides baro altitude measurements. The radio altimeter 40 provides radio altitude measurement from the terrain surface. The terrain database 50 provides global terrain data and obtains the terrain height of the current vehicle position and surrounding terrain height data.

A synthetic vision system 70 can be connected with the positioning/ground proximity warning system processor 60 to provide the flight crew with an enhanced vision field display for the ground proximity warning. A voice device 80 can be connected with the positioning/ground proximity warning system processor 60 to provide the flight crew with audible ground proximity warning messages.

The terrain database 50, which is connected with the integrated positioning/ground proximity warning system processor 60, receives the query parameters of the database from the integrated positioning/ground proximity warning system processor 60, and outputs the terrain height data of the current vehicle position and surrounding area to the integrated positioning/ground proximity warning system processor 60. The terrain database 50 may be selected as:

An onboard terrain database 50.

A ground-based terrain database 50, which is accessed through a data link by the integrated positioning and ground proximity warning system.

The connection between the global position system, the inertial navigation system 20, the baro altimeter 30, the radio altimeter 40, the terrain database 50, the integrated positioning/ground proximity warning system processor 60, the synthetic vision system 70, the voice device 80, and the onboard Flight Control and management system 90 can be one of the following means:

(1) Bus-based structure, such as inter bus, MIL-1553, ARIC 429.

(2) Communication port-based structure, including synchronous communication interface and synchronous communication interface, such as RS-232, RS-422, RS-485, etc.

(3) Network-based structure, such as NE2000.

Figure 6:
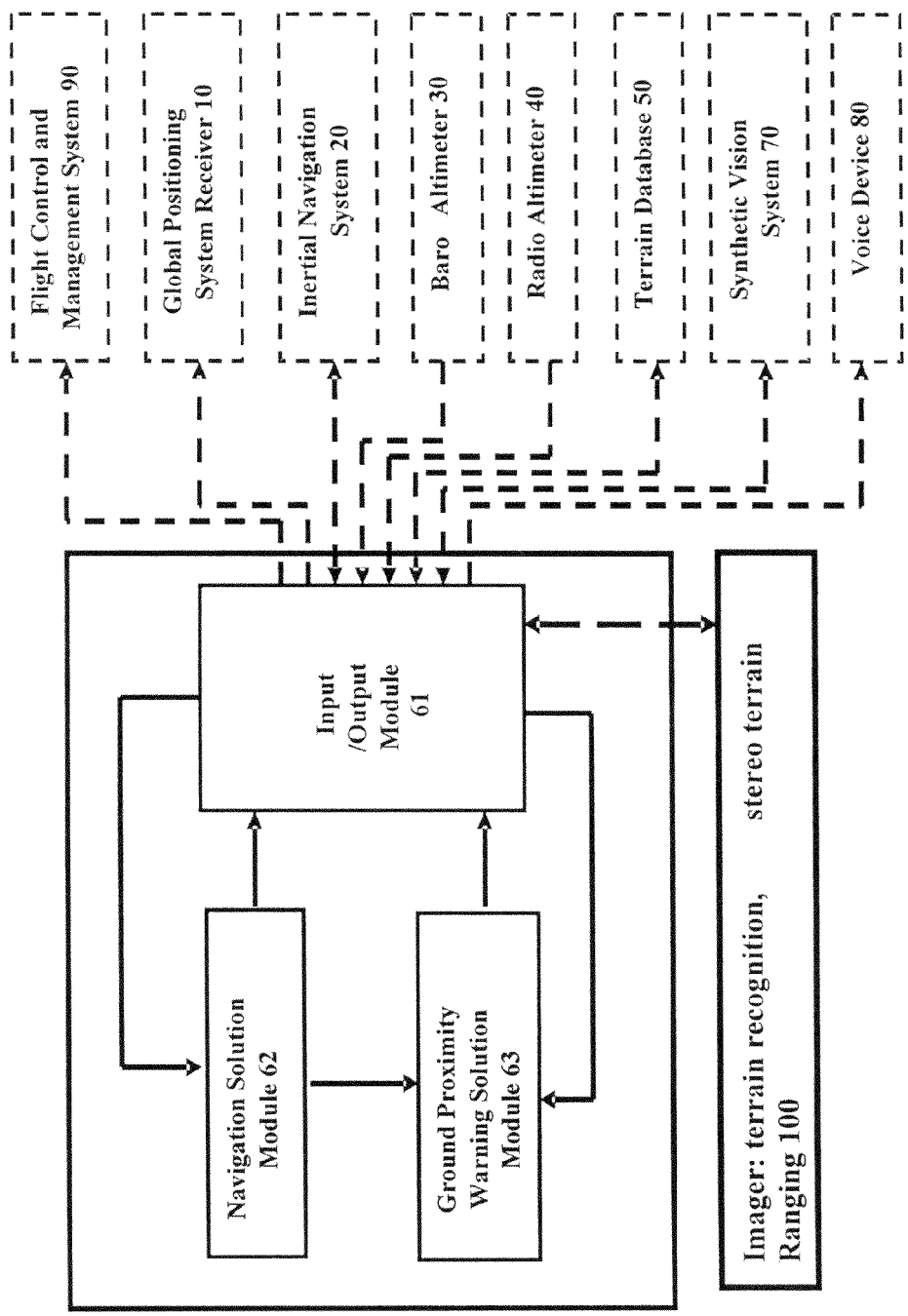
FIG. 6 is a block diagram of an integrated positioning/ground proximity warning processor.

Referring to FIG. 6, an input/output module 61 manages the input and output of data from other devices and the onboard Flight Control and management system 90. A navigation solution module 62 is connected with the input/output module 61 and a Ground Proximity warning Solution module 63. The navigation solution module 62 fuses the information from all sensors of the Integrated System, such as, imaging sensor 100, GPS, INS, altimeter, to obtain an optimal navigation solution, and outputs the obtained optimal navigation solution to the onboard Flight Control and management system 90 and the Ground Proximity warning Solution module 63, and outputs optimal position and velocity to the global positioning system receiver 10, and outputs optimal estimates of inertial navigation solution error and inertial sensor errors to the inertial navigation system 20.

Figure 7:
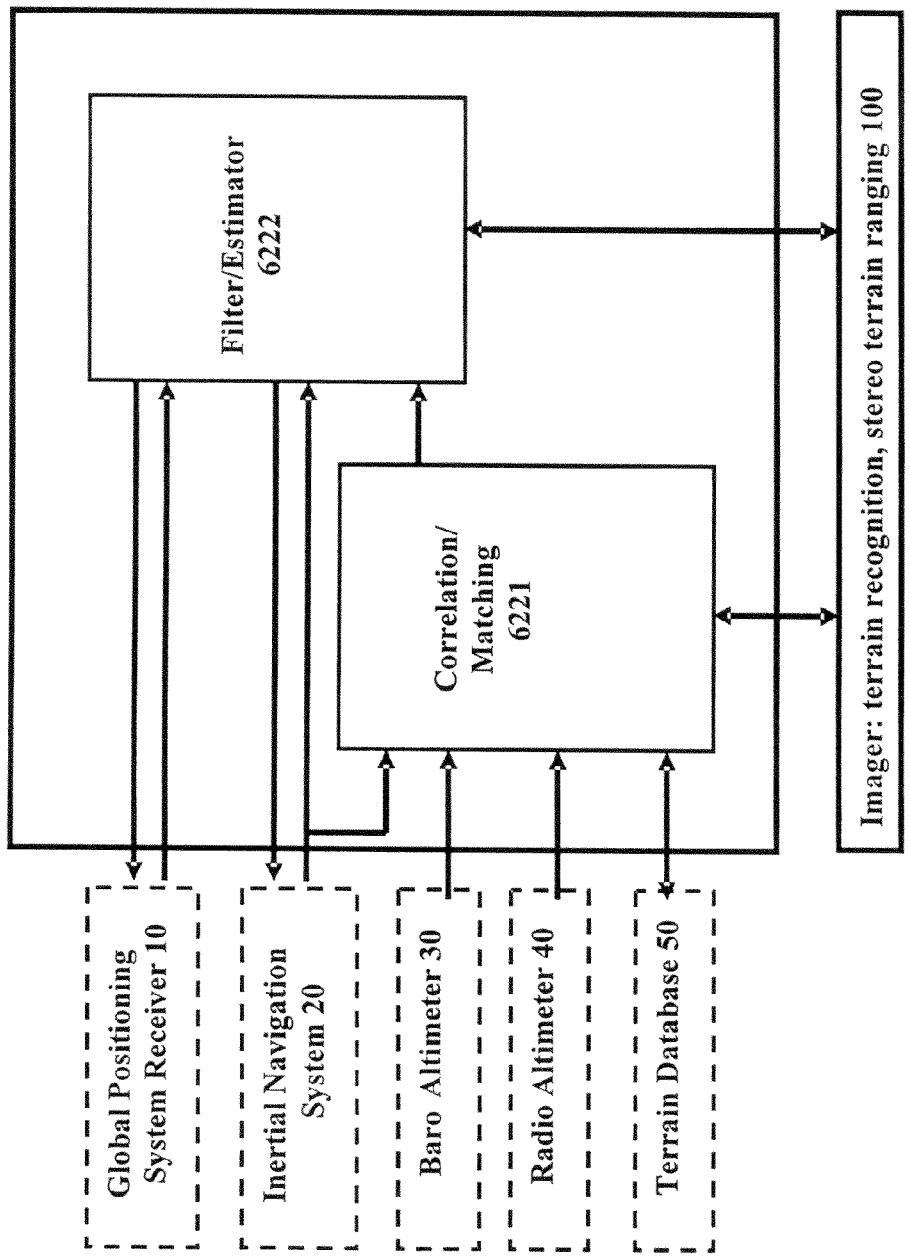
FIG. 7 is a block diagram of a realization of the navigation solution module.

Referring to FIG. 7, a correlation/matching 6201 accepts individual imaging sensor 100 based target position/altitude measurements, radio altimeter 40 measurements from the radio altimeter 40, barometric altimeter measurements from the baro altimeter 30, and terrain data from the terrain database 50 through the input/output module 61. The individual imaging sensor 100 measurements, radio altimeter 40 measurements, and barometric altimeter measurements are collected to construct a measured profile of terrain in an assigned time window. The terrain data is collected to construct a set of prestored reference terrain profiles which correspond to the area over which the vehicle is flying during the assigned window time. The measured terrain profile is then compared with the set of prestored reference terrain profiles in the correlation/matching 6201. Once a match is found, the correlation/matching 6201 outputs the geographic coordinates of the best matching reference profile to a filter/estimator 6202.

In addition, the correlation/matching 6201 differences the result of adding radio altimeter 40 measurements with terrain height of the current vehicle position with the inertial altitude solution (or hybrid baro/inertial altitude measurement) to form altitude measurement residues to the filter/estimator.

The filter/estimator 6202 filters the measurements for the global positioning system receiver 10, the inertial navigation solution from the inertial navigation system 20, and the geographic coordinates of the best matching reference profile and altitude measurement residues from the correlation/matching 6201 to obtain optimal estimates of the inertial navigation solution errors, errors of the global position system receiver, and errors of inertial sensors in a centralized filtering fashion.

In addition, the correlation/matching 6201 differences the result of adding radio altimeter 40 measurements with terrain height of the current vehicle position with the inertial altitude solution (or hybrid baro/inertial altitude measurement) to form altitude measurement residues to the TAINS local filter.

The TAINS local filter models the inertial navigation solution errors and inertial sensor errors, and filters the geographic coordinates of the best matching reference profile and altitude measurement residues to obtain the local optimal estimates of inertial navigation solution errors and inertial sensor errors.

An INSGPS local filter inputs the measurements from the global positioning system receiver 10 and the inertial navigation solution from the inertial navigation system 20 to obtain the local optimal estimates of inertial navigation solution errors, global position system receiver errors, and inertial sensor errors.

A master filter receives the local optimal estimates and covariance matrix of inertial navigation solution errors, errors of the global position system receiver, and errors of the inertial sensor from the INSGPS local filter and the local optimal estimates and covariance matrix of the inertial navigation solution errors and errors of the inertial sensor from the TAINS local filter, and filters these data, and provides the global optimal estimates of inertial navigation solution errors, the global position system receiver errors, and the inertial sensor errors.

The INSGPS local filter and the TAINS local filter accepts the fed back global optimal estimates of inertial navigation solution errors, the global position system receiver errors, and the inertial sensor errors and the covariance matrix obtained by the master filter to reset the INSGPS local filter and the TAINS local filter and performs information-sharing among the master filter, the INSGPS local filter, and the TAINS local filter.

To obtain different system performances, the communication and estimation between the master filter, the INSGPS local filter, and the TAINS local filter may have different approaches.

The master filter can also perform the consistency test among the state estimates of the master filter, the INSGPS local filter and the TAINS local filter, to detect and isolate the malfunction of a satellite of the global positioning system and to reconfigure the structure and process of the navigation solution module 62.

The individual baro altitude measurement (or hybrid baro/inertial altitude measurement) is subtracted by the height of terrain at the current position to form the referenced individual terrain-clearance measurement. The radio altitude measurement is the individual measured terrain-clearance measurement. The individual terrain clearance computation outputs the deference between the measured terrain-clearance measurement and a referenced terrain-clearance measurement to a filter/estimator 6202.

Due to the undulating nature of terrain, the terrain-clearance measurement is a nonlinear function of vehicle position. Furthermore, the difference between the measured terrain-clearance measurement and the referenced terrain-clearance measurement is a function of the inertial navigation solution errors.

The terrain clearance measurement equation is theoretically a nonlinear function of the antenna pattern of the radio altimeter 40, the cross-range/downrange position, altitude, and altitude of the vehicle. Generally, a reasonable approximation to the k th referenced terrain clearance measurement is $$TC_k = h_{INS} - h(X_k, Y_k) + v_k$$

where $TC_k$ is the kth referenced terrain clearance measurement; $h_{INS}$ is the height of the vehicle indicated by the inertial navigation system 20 or hybrid baro/inertial altitude measurement; $h(X_k, Y_k)$ is the height of the terrain at the position (X,Y) indicated by the inertial navigation system 20; $v_k$ is the error of the terrain database 50.

The master filter can also perform the consistency test among the state estimates of the master filter, the INSGPS local filter, and the TAINS local filter to detect and isolate the malfunction of the satellite of the global positioning system and to reconfigure the structure and process of the navigation solution module 62.

Figure 8:
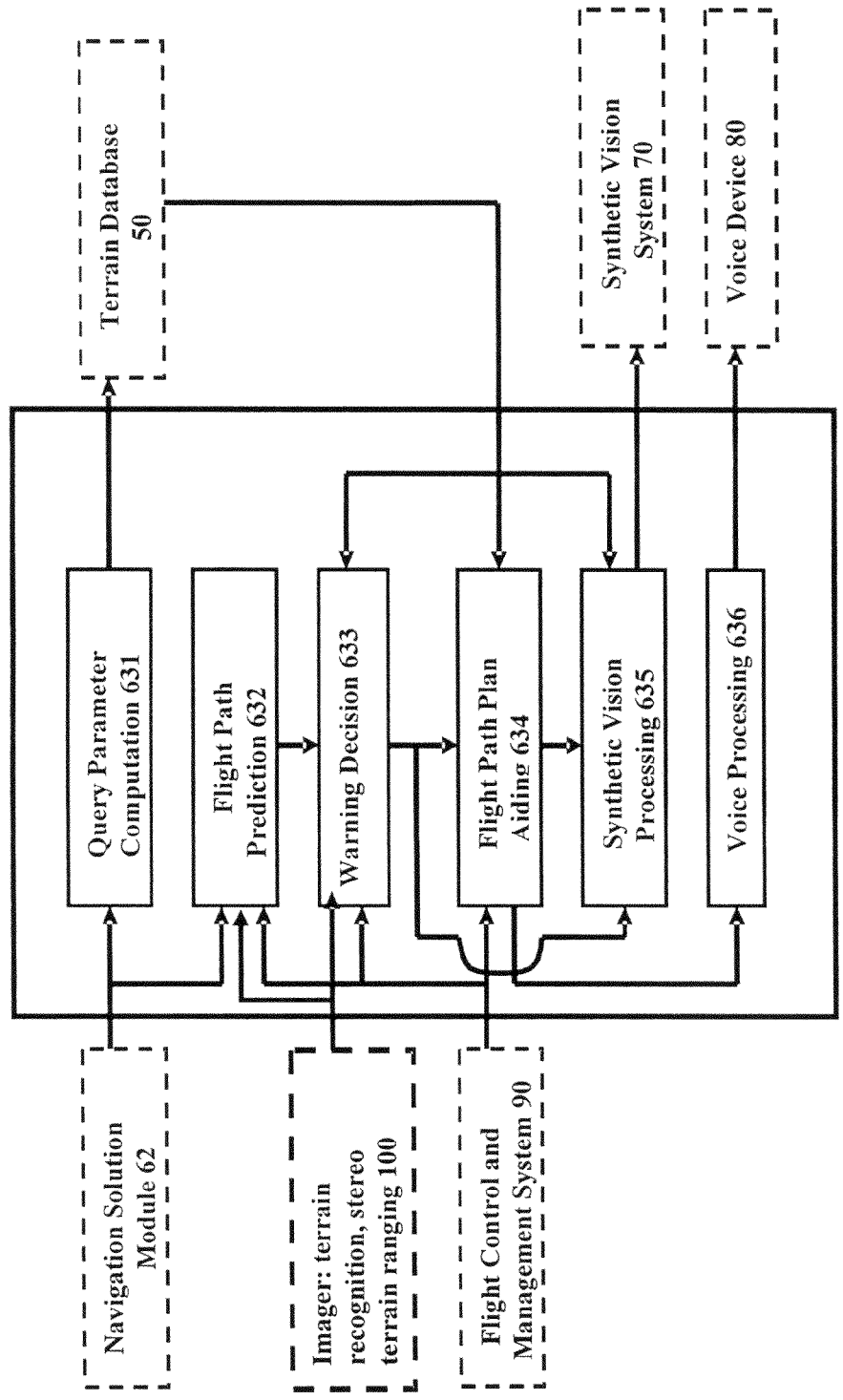
FIG. 8 is a block diagram of a ground proximity warning solution module.

Referring to FIG. 8, the Ground Proximity warning Solution module 63 further comprises a query parameter computation 631, a flight path prediction 632, a warning decision 633, a flight path plan aiding 634, a synthetic vision processing 635, and a voice processing 636.

The query parameter computation 631 receives the optimal navigation solution from the navigation solution module 62, computes the query parameters, and outputs the query parameters to the terrain database 50 to access the terrain data of the current vehicle position and surrounding terrain.

The flight path prediction 632 receives and collects the optimal navigation solution from the navigation solution module 62, the vehicle performance and configuration data from the onboard Flight Control and management system 90, and the terrain information from the imaging sensor module, and predicts the projected flight path to a warning decision 633. In addition, the flight path prediction 632 passes the current vehicle position, velocity, and altitude to the warning decision 633.

The warning decision 633 receives the projected flight path from the flight path prediction 632, the terrain information from the imaging sensor module, the vehicle performance and configuration data from the onboard Flight Control and management system 90, such as glide slope, landing gear, etc., and the surrounding terrain data from the terrain database 50. If the projected flight path is too close to the terrain, the warning decision 633 makes a warning decision message which is sent to a flight path plan aiding 634, a synthetic vision processing 635 and a voice processing 636. In addition, the warning decision 633 passes the current vehicle position, velocity, and altitude to the flight path plan aiding 634.

The flight path plan aiding 634 receives the warning decision message and the current vehicle position, velocity, and altitude information from the warning decision 633, the surrounding terrain data from the terrain database 50, and the vehicle performance and configuration data from the onboard Flight Control and management system 90, and processes these data, and provides an optimal evasion flight path to aid the flight crew.

The synthetic vision processing 635 receives the projected flight path and warning decision message from the warning decision 633, the surrounding terrain data from the terrain database 50, and the suggested optimal evasion flight path from the flight path plan aiding 634, and provides the driving data to the synthetic vision system 70.

The voice processing 636 receives the projected flight path and warning decision message from the warning decision 633, the surrounding terrain data from the terrain database 50, and the suggested optimal evasion flight path from the flight path plan aiding 634, and provides the driving data to the voice device 80.

4 Real-Time Implementation of the Integrated System

Figure 9:
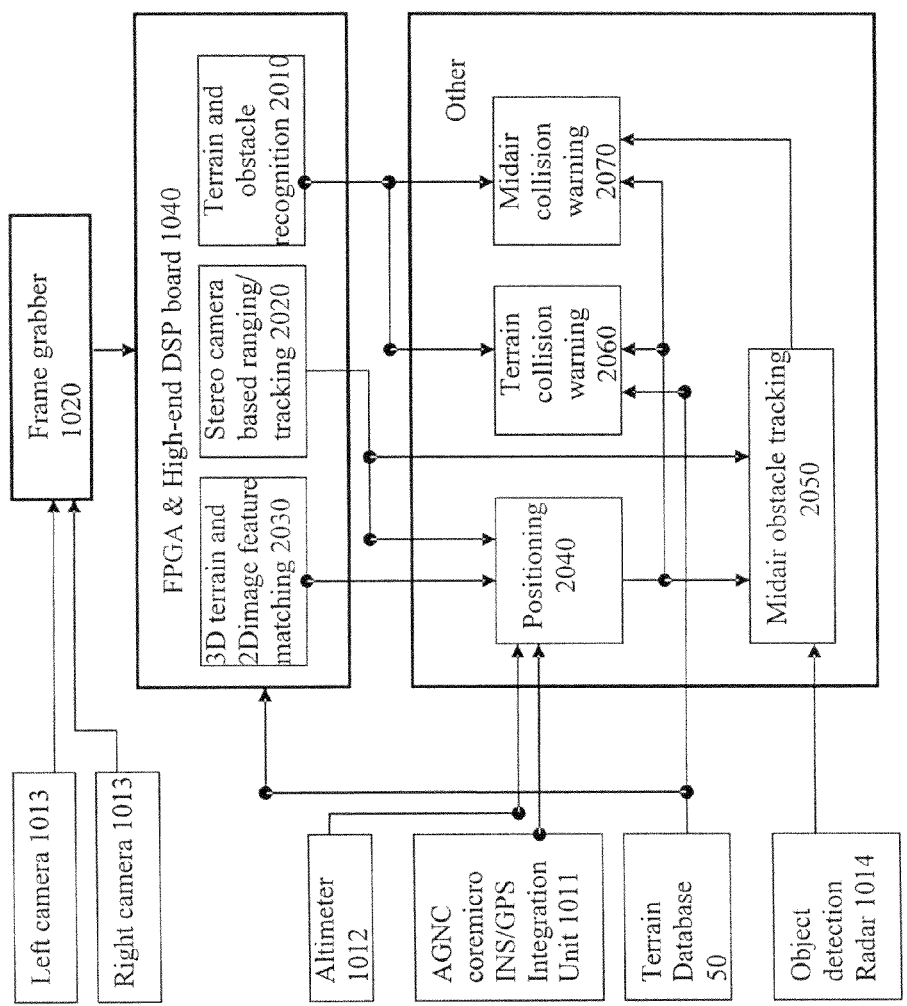
FIG. 9 is a block diagram of a real-time implementation of the integrated system.

The hardware/software system design for the real-time implementation of the Integrated System is presented here. As shown in FIG. 9, the main components of hardware and software include:

Hardware: Sensors 1010 (the AGNC coremicro AHRS/INS/GPS Integration Unit 1011, altimeter 1012, stereo camera 1013), Fame grabber 1020, FPGA 1030, High-end DSP board 1040.

Software: Terrain and obstacle recognition 2010, Stereo camera based ranging/tracking 2020, 3D terrain and 2D image feature matching 2030, positioning 2040, Midair obstacle tracking 2050, terrain collision warning 2060, midair collision warning 2070.

For the vision based Integrated System, part of components have very high computation load, such as, matching of 3D terrain features and 2D image features, image preprocessing. We divide the software components into two parts: low-computation-load and high-computation-load:

High-Computation-Load: terrain and obstacle recognition, stereo camera based ranging/tracking, 3D terrain and 2D image feature matching (including image preprocessing, edge detection, feature matching, etc)

Low-Computation-Load: positioning, midair obstacle tracking, terrain collision warning, midair obstacle collision warning.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An integrated collision system, comprising:
an integrated positioning/ground proximity warning system processor;
a flight control and management system which provides vehicle performance and configuration data;
an imaging sensor which provides recognized local terrain information based on the use of a trained classifier of a user's choice and ranged terrain information when using a stereo camera as said imaging sensor;
a global positioning system (GPS) receiver which provides signals necessary for deriving position, velocity, and time information and for selectively doing pseudorange and delta range measurements;
an inertial navigation system (INS) which solves navigation solutions with angular rate and specific force information from an inertial measurement unit (IMU) for outputting an inertial navigation solution with vehicle position, altitude, and velocity;
a baro altimeter which measures air pressure and computes baro altitude measurements;
a radio altimeter which measures a time delay between transmission and reception of a radio signal from a terrain surface and computes radio altitude measurements;
a worldwide digital terrain database which includes terrain height data at the current vehicle position as well as the surrounding area;
a radar for detecting and tracking midair obstacles;
means for filtering and estimation in which information from said GPS receiver, said INS, geographical coordinates, and altitude measurement residuals to obtain optimal estimates of inertial navigation solution errors, errors of said global positioning system receiver, and errors of inertial sensors in a centralized filtering fashion, wherein said filtering means comprises:
a first local filter modeling said inertial navigation solution errors and inertial sensor errors, and filtering said geographic coordinates of the best matching reference profile and said altitude measurement residuals so as to obtain said local optimal estimates of inertial navigation solution errors and inertial sensor errors;
a second local filter inputting said measurements from said global positioning system receiver and inertial navigation solution to obtain local optimal estimates of inertial navigation solution errors, global positioning system receiver errors, and inertial sensor errors; and
a master filter receiving local optimal estimates and covariance matrices of: (i) inertial navigation solution errors from said first and second local filters, (ii) global positioning system receiver errors from said second local filter, and (iii) inertial sensor errors from said first and second local filters, and by filtering these data provide global optimal estimates of inertial navigation solution errors, global positioning system receiver errors, and inertial sensor errors; wherein said master filter feeds back said global optimal estimates and covariance matrices of inertial navigation solution errors, global positioning system receiver errors, and inertial sensor errors to said first and second local filters for resetting and for performing information sharing among all three filters;
a synthetic vision system which visually displays the current air vehicle position, projected flight path, warning decision message, surrounding terrain data, and suggested optimal evasion flight path; and
a voice device which indicates a collision avoidance warning.

2. The system, as recited in claim 1, wherein said integrated positioning/ground proximity warning system processor comprises:
a navigation solution module for generating an optimal navigation solution;
a ground proximity warning solution module for generating a midair object proximity warning solution and ground/terrain proximity warning solution; and
an input/output module for managing said navigation solution module, said ground proximity warning solution module, said flight control and management system, said imaging sensor, said GPS receiver, said INS, said baro altimeter, said radio altimeter, said worldwide digital terrain database, said synthetic vision system, and said voice device.

3. The system, as recited in claim 2, wherein said navigation solution module comprises:
a correlation/matching module; and
a filter/estimator module consisting of two local filters and a master filter.

4. The system, as recited in claim 1, wherein said radar is a moving target indicator (MTI) radar.

5. An integrated collision avoidance method for a host vehicle, comprising the steps of:
(a) generating an optimal estimate of said host vehicle's current position, altitude, and velocity by the steps of:
(a.1) using an imaging sensor which provides recognized local terrain information based on the use of a trained classifier of a user's choice and ranged terrain information when using a stereo camera;
(a.2) using a global positioning system (GPS) receiver which provides signals necessary for deriving position, velocity, and time information and for selectively doing pseudorange and delta range measurements;
(a.3) using an inertial navigation system (INS) which solves navigation solutions with angular rate and specific force information from an inertial measurement unit (IMU) for outputting an inertial navigation solution with vehicle position, altitude, and velocity;
(a.4) using a baro altimeter which measures air pressure and computes baro altitude measurements;
(a.5) using a radio altimeter which measures a time delay between transmission and reception of a radio signal from a terrain surface and computes radio altitude measurements; and
(a.6) using said worldwide digital terrain database which includes terrain height data at the current vehicle position as well as the surrounding area;
wherein said optimal estimate of said host vehicle's current position, altitude, and velocity requires data fusion which comprises the steps of:
correlation and matching in which said signals from said imaging sensor, said INS, said baro altimeter, said radio altimeter, and said worldwide digital terrain database are collected to construct a measured profile of said terrain in an assigned time window which is then compared with a set of pre-stored reference terrain profiles for outputting (i) geographical coordinates of the best matching reference profile, and (ii) differences that result from adding said radio altimeter measurements, and said terrain height at said current vehicle position, and said inertial altitude solution for forming altitude measurement residuals; and
filtering and estimation in which the information from said GPS receiver, said INS, said geographical coordinates, and said altitude measurement residuals are filtered to obtain optimal estimates of inertial navigation solution errors, errors of said global positioning system receiver, and errors of inertial sensors in a centralized filtering fashion which comprises the steps of:

using a first local filter to model said inertial navigation solution errors and inertial sensor errors, and to filter said geographic coordinates of the best matching reference profile and said altitude measurement residuals so as to obtain said local optimal estimates of inertial navigation solution errors and inertial sensor errors;

using a second local filter to input said measurements from said global positioning system receiver and inertial navigation solution to obtain local optimal estimates of inertial navigation solution errors, global positioning system receiver errors, and inertial sensor errors;

using a master filter to receive local optimal estimates and covariance matrices of: (i) inertial navigation solution errors from said first and second local filters, (ii) global positioning system receiver errors from said second local filter, and (iii) inertial sensor errors from said first and second local filters, and by filtering these data provide global optimal estimates of inertial navigation solution errors, global positioning system receiver errors, and inertial sensor errors; and feeding back said global optimal estimates and covariance matrices of inertial navigation solution errors, global positioning system receiver errors, and inertial sensor errors from said master filter to said first and second local filters for resetting and for performing information sharing among all three filters; and (b) predicting a flight path by said host vehicle future position, altitude and velocity;

(c) predicting a terrain collision based on said flight path prediction and terrain environment;

(d) providing visual and voice alerts if said terrain collision is possible; and (e) computing a flight path aiding with an optimal escaping method by fusing information from said warning decision, current vehicle position, altitude, and velocity, terrain environment, and vehicle performance and configuration data.

6. The method as recited in claim 5 wherein, in the step (b), wherein said prediction of said host vehicle future position, altitude and velocity is accomplished by fusing position, altitude, and velocity from said optimal navigation solution, vehicle performance configuration data from an on-board flight control and management system, and terrain information from said imaging sensor.

7. The method as recited in claim 5, before the step (d), further comprising a step of determining a ground/terrain proximity warning solution which comprises the steps of:

determining said terrain environment based on information from said worldwide digital terrain database as well as local recognized terrain based on said imaging sensor and local ranged terrain when using said stereo camera as said imaging sensor; and comparing information regarding said terrain environment and a projected flight path for predicting a terrain collision and issuing a warning decision.

8. The method as recited in claim 5, before the step (d), further comprising a step of determining a midair object proximity warning solution by the steps of:

detecting and tracking midair obstacles based on midair obstacle detection radar and imaging;

recognizing midair obstacles based on said imaging sensor and ranging local obstacles when using said stereo camera as said imaging sensor; and comparing information regarding said midair obstacles and said projected flight path for predicting a midair collision and issuing said warning decision.

* * * * *